United States Patent Office 3,825,447
Patented July 23, 1974

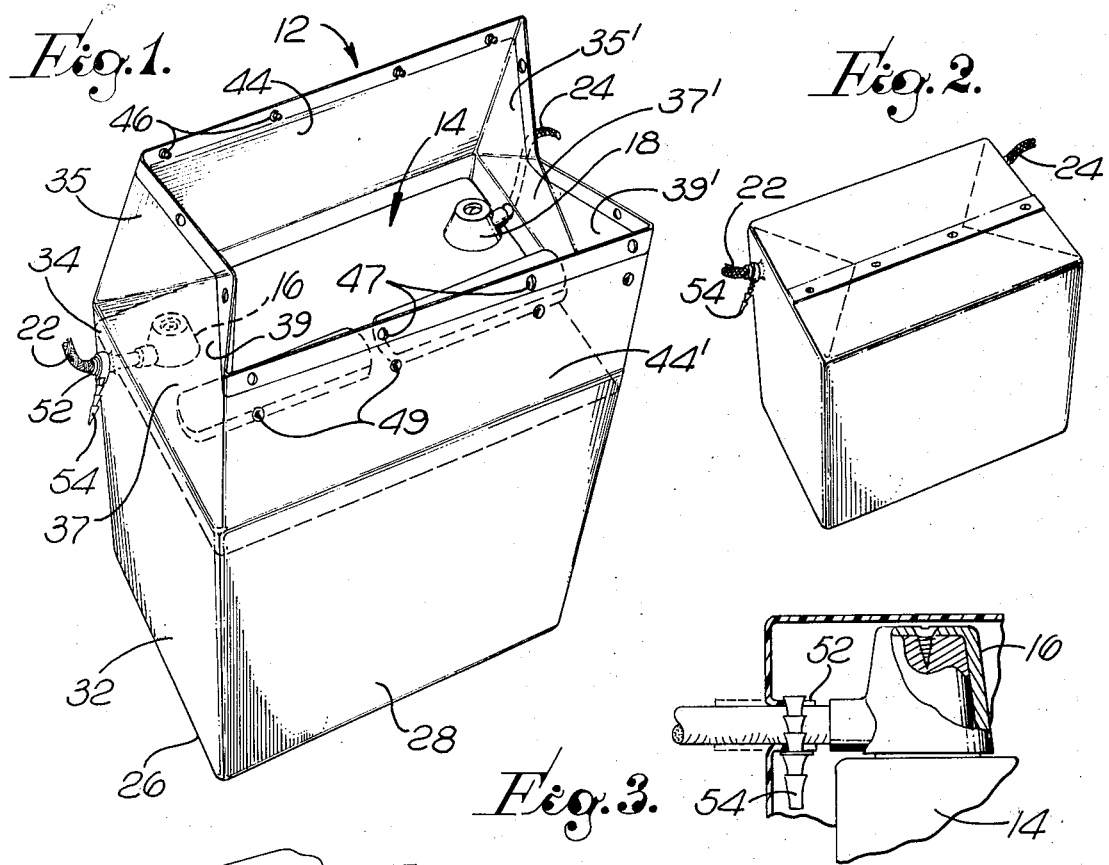
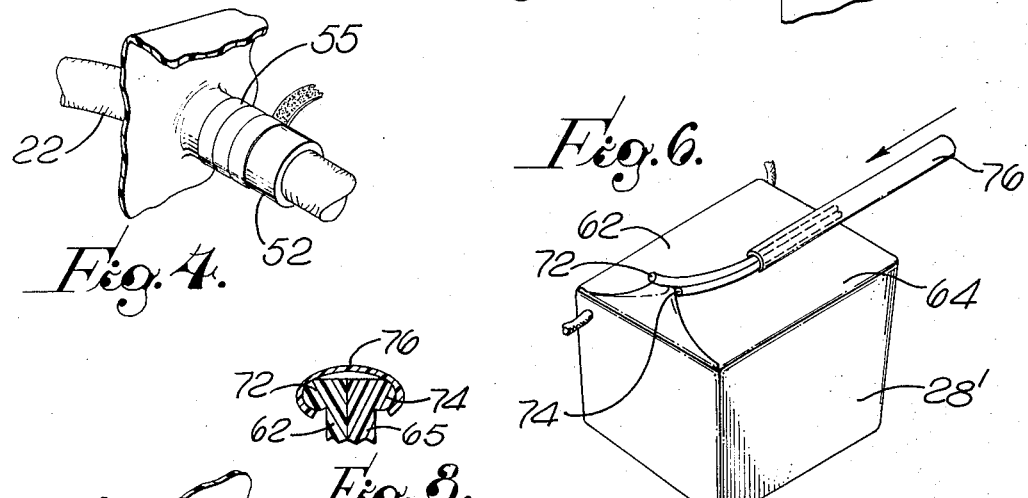
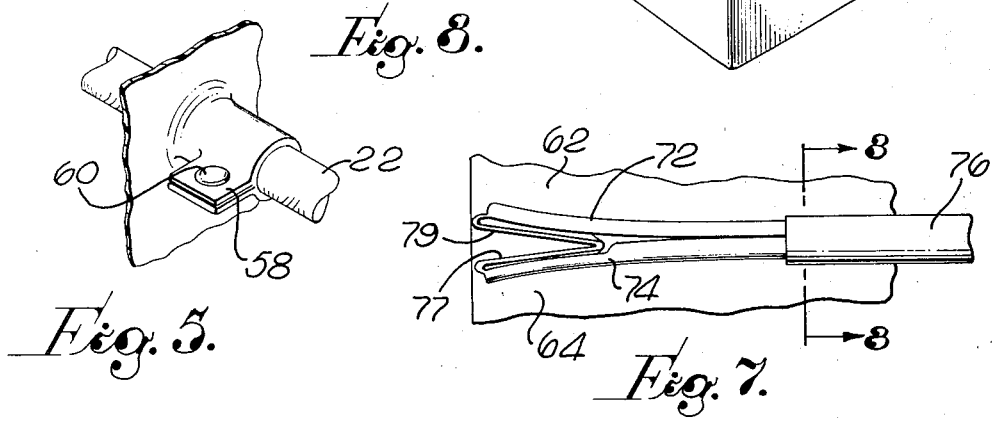

3,825,447
BATTERY COVER
Ralph Kraals, 551 Evergreen Drive,
Pasadena, Calif. 91105
Filed July 17, 1972, Ser. No. 272,616
Int. Cl. H01m 1/02
U.S. Cl. 136—166    6 Claims

ABSTRACT OF THE DISCLOSURE

A battery cover for preventing corrosive damage due to chemicals emanating from a battery. An enclosed container is defined by side walls, a bottom wall and a top wall having closure means thereon. Openings in the container enable a cable to pass through the container and to electrically connect to the battery. Means are provided for tightly securing the container to the cables at the openings.

FIELD OF THE INVENTION

The field of art to which the invention pertains includes the field of containers, particularly with respect to a battery cover for preventing damage due to chemical emanations from a battery.

BACKGROUND AND SUMMARY OF THE INVENTION

Conventional storage batteries, such as those used with automobiles and other vehicles utilize an electrolyte which is an acid. Emanations from the acid electrolyte results in corrosive damage in the general vicinity of the battery. Typically, in conventional storage batteries, acid which emanates from the battery is of sufficient strength that portions of the vehicle can be severly damaged by corrosion. Prior art covers which have been utilized to act as a shield for the vehicle from emanations have been relatively complex. In addition, it has been found that it it is difficult to obtain ready access to the battery in order to provide necessary servicing of the battery such as the addition of water to the battery or cleaning of the battery terminals. Moreover, it has been found that the prior art covers were not completely sealed where the electrical cable connections to the battery were made. Typical prior patents of interest include:

U.S. Pat. 1,983,507
U.S. Pat. 2,707,721
U.S. Pat. 3,146,132
U.S. Pat. 3,408,234

The present invention provides a battery cover which prevents corrosive damage due to electrolytic emanations from the battery. Sealed openings are provided so as to enable electrical cable connections to the battery while simultaneously preventing electrolytic emanations from the openings. Access to the battery for routine servicing is simply and easily provided.

Specifically, the battery cover comprises an enclosed container defined by side walls, a bottom wall, and a top wall having closure means thereon. Openings are provided for enabling a cable to pass through the container while simultaneously allowing means for tightly securing the container to the cable at the opening. The opening is defined by a flange section which is secured to the cable by means of either a tie member, a tape member, or a snap-fastener. The flange section extends either inwardly into the container or outwardly therefrom. The container closure includes a pair of flaps extending along the top wall. Alternatively, the edge of each flap is formed with a beaded cross-section, and a hollow slide having an open ovate cross-section secures the flaps together. The flaps may be joined together by means of a zipper or snaps.

The advantages of this invention, both as to its construction and mode of operation, will be readily appreciated as the same becomes better understood by reference to the following detailed description when considered in connection to the accompanying drawings in which like reference numerals designate like part throughout the figures.

BRIEF DESCRIPTION OF THE DRAWINGS

FIG. 1 is a perspective view of a battery cover shown in a partially open position;
FIG. 2 is a perspective view of the cover of FIG. 1 shown in a fully closed position;
FIG. 3 is a view, partly in section, of an alternative arrangement of sealing the cable opening in the battery cover of FIG. 1;
FIG. 4 is a perspective view of another alternative arrangement for sealing the opening in the battery cover to the cable;
FIG. 5 is a perspective view of another alternative arrangement for sealing the opening in the battery cover to a cable;
FIG. 6 is a perspective view of an alternative arrangement for sealing the battery cover;
FIG. 7 is a top plan view of the arrangement of FIG. 6; and
FIG. 8 is a cross-sectional view illustrating the sealing arrangement of FIGS. 6 and 7 taken along the line 8—8 of FIG. 7, in the directions of the arrows.

DETAILED DESCRIPTION

Referring now to FIG. 1 there is shown a battery cover 12 having a conventional storage battery 14 positioned therein. The battery 14 has a pair of terminals 16, 18 at opposite ends of its top surface with electrical cables therefor 22, 24 respectively, secured thereto and extending through the cover 12. The battery cover 12 comprises a bottom wall 26, side walls 28, and end walls 32 all integrally connected to form a container for the battery. Typically, the cover may be made of any pliable polyethylene, of six to ten thousandths of an inch thick. Openings 34 are formed in each of the end walls 32 enabling the cables 22, 24 to extend through the battery cover and allow the battery to be connected for normal use. In an automobile, typically the cable 22 is connected to the electrical circuits of the automobile and the cable 24 is a flat braided cable which is grounded to the automobile chassis.

The top of the battery cover extends from the walls 28 and 32 and comprises a plurality of integral flaps 35, 37, 39, and 35', 37', 39' triangular-shaped flap members which are made integral with the end walls 32 at the top edge thereof and generally rectangulary-shaped outer flap members 44 and 44' which are made integral with the top surface of the side walls 28. After the triangular shaped flaps are positioned on the battery top surface the flaps 44 and 44' are secured together by means of male fastener parts 46 formed on the edge surface of the top flap 44, which extends through the openings 47 to engage female fastener parts 49 spaced from the opening 47. The cover 12 thus completely encloses the battery and prevents electrolytic emanations therefrom.

A tubular flange section 52 is formed integrally around each of the openings 34 with the end walls 32. The flange section 52 extends outwardly from the cover and surrounds each of the cables 22, 24. Normally the flange section 52 is made large enough so as to enable the enlarged terminal portion of the cable to extend through the opening. After the terminal portion of the cable has been secured to the battery, a tie 54 is positioned around the tubular flange section so as to completely seal the flange section to the cable. In addition, it should be noted that the flange section 52 has sufficient flexibility so that it may be connected to either a round cable 22 or the flat cable 24 which is typically used as a grounding member so as to connect one end of the battery to ground in an automobile.

Alternatively, as shown in FIG. 3, the flange section 52 may extend inwardly into the battery cover and surround the cable so as to enable the flange section to be secured by the tie 54 to the cable prior to securing the flaps over the battery case. In this embodiment, the cover 12 is formed with sufficient clearance from the side walls of the battery to permit tying of the flanges.

In FIG. 4 an alternative arrangement is illustrated for securing the flange section 52 to the cable. Tape 55 is utilized which is wound tightly around the flange section 52 and with sufficient force to secure the flange section to the cable 22. Alternatively, in FIG. 5, the flange section is provided with tab portions 58 having snaps 60 therein which are used to secure the flange section to the cable. It should be noted that in the embodiments of FIGS. 4 and 5, the flange section can be secured to the cable either internally or on the exterior of the cover.

Referring now to FIGS. 6, 7 and 8 there is shown an alternative arrangement for providing a closure mechanism for the battery cover. The walls 28' are formed similarly to that of the cover of FIG. 1, the closure flaps being integrally formed in triangular and rectangular sections. The opposite edge surfaces of the rectangular flaps 62, 64 adjoin each other at the center of the battery with the edges having beads 72 and 74, respectively, which extend along the edge of the adjoining portions of the flaps. Additionally, as best shown in FIG. 7, the center top inner section of the flap 64 is thickened, about 2 thickness additionally, compared to the overall thickness, to accommodate the thicknesses of the turned in end flaps 77 and 79. A tubular slide 76 having a slotted opening is slipped over the battery cover along the beads 72 and 74, drawing the beads together within the slide 76. As shown in FIG. 7, the slide 76 has an open ovate cross-section. This arrangement provides a rapid sealing mechanism for securing the flaps 62 and 64 together.

To service the battery in the embodiment of FIG. 6 it is merely necessary to pull the slide 76 off the battery cover and open the flaps 62 and 64. Alternatively, it should be understood that the bead and pipe arrangement of FIG. 6 could be replaced by a zipper so as to also enable rapid service of the battery when needed.

I claim:
1. A battery cover for preventing corrosive damage due to electrolytic emanations from a battery having electrical cable connections thereto comprising:
   an enclosed container of pliable material defined by side walls, a bottom wall, and a top wall having closure means thereon;
   an opening for enabling a cable to pass through said container;
   means for tightly sealing and securing pliable material of said container to said cable at said opening for preventing electrolytic emanations from said battery to the exterior of said container and a flange section defining said opening, said flange section being secured to said cable and being integrally formed of said pliable material.
2. A battery cover in accordance with Claim 1 wherein said means for securing said flange section to said cable includes a tie member.
3. A battery cover in accordance with Claim 1 wherein said means for securing said flange section to said cable includes a tape member.
4. A battery cover in accordance with Claim 1 wherein said means for securing said flange section to said opening includes a snap-fastener.
5. A battery cover in accordance with Claim 1 wherein said flange section extends inwardly into said container.
6. A battery cover in accordance with Claim 1 wherein said flange section extends outwardly from said container.

References Cited

UNITED STATES PATENTS

| | | | |
|---|---|---|---|
| 2,094,329 | 9/1937 | Mascuch | 136—170 |
| 2,856,449 | 10/1958 | Coler | 136—132 |
| 2,707,721 | 5/1955 | Anderson et al. | 136—166 |
| 3,146,132 | 8/1964 | Nathan | 136—166 |
| 1,399,702 | 12/1921 | Eaton | 136—170 |
| 1,983,507 | 12/1934 | Woodbridge | 136—166 |

DONALD L. WALTON, Primary Examiner

U.S. Cl. X.R.

136—181